US005959278A

United States Patent [19]

[11] Patent Number: 5,959,278
[45] Date of Patent: Sep. 28, 1999

Kobayashi et al.

[54] INFORMATION CARD PRODUCING DEVICE

[75] Inventors: Takehito Kobayashi, Nirasaki; Toshihito Shiina, Yamanashi-ken, both of Japan

[73] Assignee: Nisca Corporation, Yamanashi, Japan

[21] Appl. No.: 08/746,114

[22] Filed: Nov. 6, 1996

[30] Foreign Application Priority Data

Nov. 9, 1995 [JP] Japan .................................... 7-291127

[51] Int. Cl.$^{6}$ .............................. G06K 7/00; B41J 2/315; B41J 11/00

[52] U.S. Cl. .......................... 235/449; 235/375; 101/232; 347/218

[58] Field of Search .................................... 235/449, 493, 235/494, 475, 477, 483, 380, 384, 379, 375; 347/218; 101/232

[56] References Cited

U.S. PATENT DOCUMENTS

| | | | |
|---|---|---|---|
| 5,133,615 | 7/1992 | Saito et al. | 400/621 |
| 5,229,586 | 7/1993 | Ishii | 235/375 |
| 5,309,176 | 5/1994 | Faes et al. | 346/76 PH |
| 5,410,642 | 4/1995 | Hakamatsuka et al. | 395/113 |
| 5,692,845 | 12/1997 | Faes et al. | 400/692 |
| 5,768,143 | 6/1998 | Fujimoto | 235/375 |
| 5,771,058 | 6/1998 | Kobayashi | 347/218 |

*Primary Examiner*—Michael G. Lee
*Assistant Examiner*—Drew A. Dunn
*Attorney, Agent, or Firm*—Kane, Dalsimer, Sullivan, Kurucz, Levy, Eisele and Richard, LLP

[57] ABSTRACT

Recording units including a printer for printing information data on at least one surface of a recording medium card are arranged vertically one over another in an information card producing device. Card turning portions are disposed confronting the respective recording units, so that the card can be transferred between the card turning portions and the recording units and turned over, thereby recording the desired information data on one or both of the surface of the card. The recording unit includes a magnetic encoder and/or IC memory reader/writer and has a function of verifying the information data written to the card so as to send out the card to a card discharge port when adequately recorded or to a card reject port when a write error is found.

15 Claims, 12 Drawing Sheets

INFORMATION CARD PRODUCING DEVICE

BACKGROUND OF THE INVENTION

1. Field of the Invention

This invention relates to a device for producing information cards on which various data such as personal information are recorded, and more particularly to an information card producing device intensively incorporating a plurality of recording units necessary for recording information on an information card, which includes one or more printer units for printing visible data such as letters, images and the like on the card, a magnetic encoder for magnetically recording various information data on the card, and an IC memory reader/writer.

2. Description of the Prior Art

There have been adopted information card producing devices for the purpose of printing visible information such as letters, bar code patterns, pictures and the like on the surface of an information card serving as an information recording medium such as ID (identification) plastic cards, credit plastic cards and IC cards, and magnetically or electronically recording various information on a magnetic stripe formed on the surface of a card or a built-in IC memory. In most cases, thermal transfer printers have been conveniently used for printing the visible information such as images.

The thermal transfer printers are put to its proper use in accordance with types of information. That is, a thermal wax-transfer printer is applied for printing two-gradation (monochrome) images such as letters, and a dye-sublimation printer having excellent representability is suitable for printing multi-gradation color images such as a photograph. According to the usage of the information card, recording units including one or more thermal transfer printers and a magnetic encoder are needed for the information card producing device.

In a conventional information card producing device, the aforesaid recording units are arranged on the line along a straight and slender card path formed for transferring an information card while recording data on the card. Where the information data are required to be recorded on both sides of the card, the information card producing device is often provided with a means for turning the card upside down to record the information data on both surfaces of the card.

The information card producing device having the aforenoted recording units and card turning means is taught by, for instance, U.S. Pat. No. 5,326,179 to Fukai et al. One example in which a protective film coating unit for thermally transferring a protective film onto the surface of a recording card is disposed in juxtaposition to a recording unit as noted above is disclosed in U.S. Pat. No. 5,220,343 to Takanashi et al. Thus, components which have been proposed so far can be assembled in the information card producing device as required for the purposes.

However, in any case, from the point of view of the function and structure of the conventional device, the constituent elements of the device such as the recording unit, magnetic encoder and protective film transferring means must be basically disposed straight on the line along a long card feeding path.

Thus, in order for providing the information card producing device with various functions, the card feeding path is required to be more elongated so as to arrange all the elements for fulfilling the desired functions on the straight line. That is, since the information card producing device fundamentally necessitates a blank card supply unit and a card discharge unit, it is simply surmised that the whole length of the device having printing units, magnetic encoder and card turning means becomes over at least four or five times as long as the length of the card. Accordingly, the device singularly lengthens compared with the width of the device and is made unsightly so much as to be incongruous with peripheral components as one of office automation equipments and so forth. Therefore, the long device becomes awkward to handle and not sufficiently unmarketable.

When an error in writing information data to the card occurs in the magnetic encoder at worst, such a faulty card should be rejected and selectively discharged to a portion other than a discharge portion to which rightly recorded cards are discharged. However, in the card producing device in which the component elements are arranged on the line along the straight card feeding path extending from a card entrance to a card exit, the card reject portion serving as a second card exit is difficult to dispose.

In general, an ordinary information card producing device is provided with a recording unit capable of printing or recording information data on one surface of the card. However, there are devices provided with card turning means for turning over the card so as to select one of the surfaces of the card according to the purposes for which the card is used as disclosed in the aforementioned U.S. Patents.

The card turning means is disposed on the card feeding path, and commonly comprises pairs of rollers for holding the card in turning. The card turning means however requires a complicated mechanism and highly skilled controlling technique for preventing the card held by the rollers from being dislocated during the turning operation. However, disadvantageously, the complicated card turning mechanism found in the conventional device suffers from operational inefficiency and instability, and inevitably turns out to be expensive.

OBJECT OF THE INVENTION

One object of the present invention is to provide an information card producing device having a simple structure capable of intensively incorporating recording units such as printing means and a magnetic encoder, card supply unit and card discharge unit, which is well-matched as one of components constituting an office automation equipment or the like and can be heightened in marketability and handling property.

Another object of the present invention is to provide an information card producing device capable of rationally arranging a plurality of recording units including printing, means and a magnetic encoder along a card transfer portion so as to stably transfer and turn over an information card fed through the card transfer portion, thereby to produce high quality information-recorded cards.

Still another object of the present invention is to provide an information card producing device having card turning means capable of stably and accurately turning the card without bringing about dislocation of the card by use of a reliable and case control system when turning over the card in a card transfer portion, thereby to increase the accuracy of writing data and stability.

Yet another object of the present invention is to provide an information card producing device having a card reject portion capable of rejecting a card deemed as faulty upon verifying information data recorded on the information card, which is rationally arranged in order along with a card supply portion and a card discharge portion.

SUMMARY OF THE INVENTION

To attain the objects described above according to this invention, there is provided an information card producing device comprising two or more recording units including printing means, which are vertically arranged one over another, and a plurality of card turning units for transferring a recording medium relative to the recording units and turning the recording medium card.

The recording units are arranged vertically one over another in a recording portion, thus intensively incorporating in order the constituent components in the information card producing device. Thus, the information card producing device can be neatly designed and improved on handling and installing properties.

The recording units may incorporate a magnetic encoder capable of magnetically recording various information data. It is desirable to use a thermal transfer printer as the printing means, which can selectively adopt a thermal wax-transfer ink ribbon or a dye-sublimation ink ribbon.

Two-gradation images such as letters and bar code patterns may be printed with thermal wax-transfer ink, and multi-gradation images such as full color photographs may be printed with dye-sublimation ink. Even though printers of different types are incorporated as the recording units according to the purposes for which they are used, the recording units can be rationally arranged vertically, thus to increase designing, handling and installing properties.

There are placed a card supply portion on one side of the recording portion and a card discharge portion on the other side of the recording portion, so that a card transfer portion is disposed between the recording portion and the card supply portion or the card discharge portion, so as to place card turning portions by the sides of the respective recording units arranged vertically one over another.

Each card turning portion comprises pairs of rollers for holding the card, a rotating frame for supporting the rollers, which is rotatable about a rotating shaft, rotational driving means for causing the aforementioned rollers to rotate on their own axes to feed the card held by the rollers, and revolving means for rotating said rotating frame to cause the rollers to revolve around the aforementioned rotating shaft.

Turning or direction-changing of the card is fulfilled by operating the revolving means while holding the card between the paired rollers without rotating the rollers on their own axes. The prevention of rotation of the rollers can prevent the card from being dislocated during revolution of the rollers.

Transferring of the card between the recording units of the recording portion is performed by driving the rotational driving means in one direction while holding the card by the paired rollers. To change the direction in which the card is transferred, the rotating frame may be turned round at a prescribed angle.

Other objects and features of the present invention will be hereinafter explained in detail with reference to the accompanying drawings.

DESCRIPTION OF THE PREFERRED EMBODIMENTS

This invention relates to an information card producing device for producing information cards such as ID cards and credit cards on which various information data such as personal information are recorded. The device of the invention has functions of printing visible information data such as letters, patterns and photographs on at least one surface of a card base of a plastic information card or an IC card incorporating an electronic memory, and/or writing magnetically-coded information data to a magnetic stripe formed on at least one surface of the card base. The device of the invention may further possess a function of digitally writing information data to built-in electronic memories of the IC card.

Figure 1:
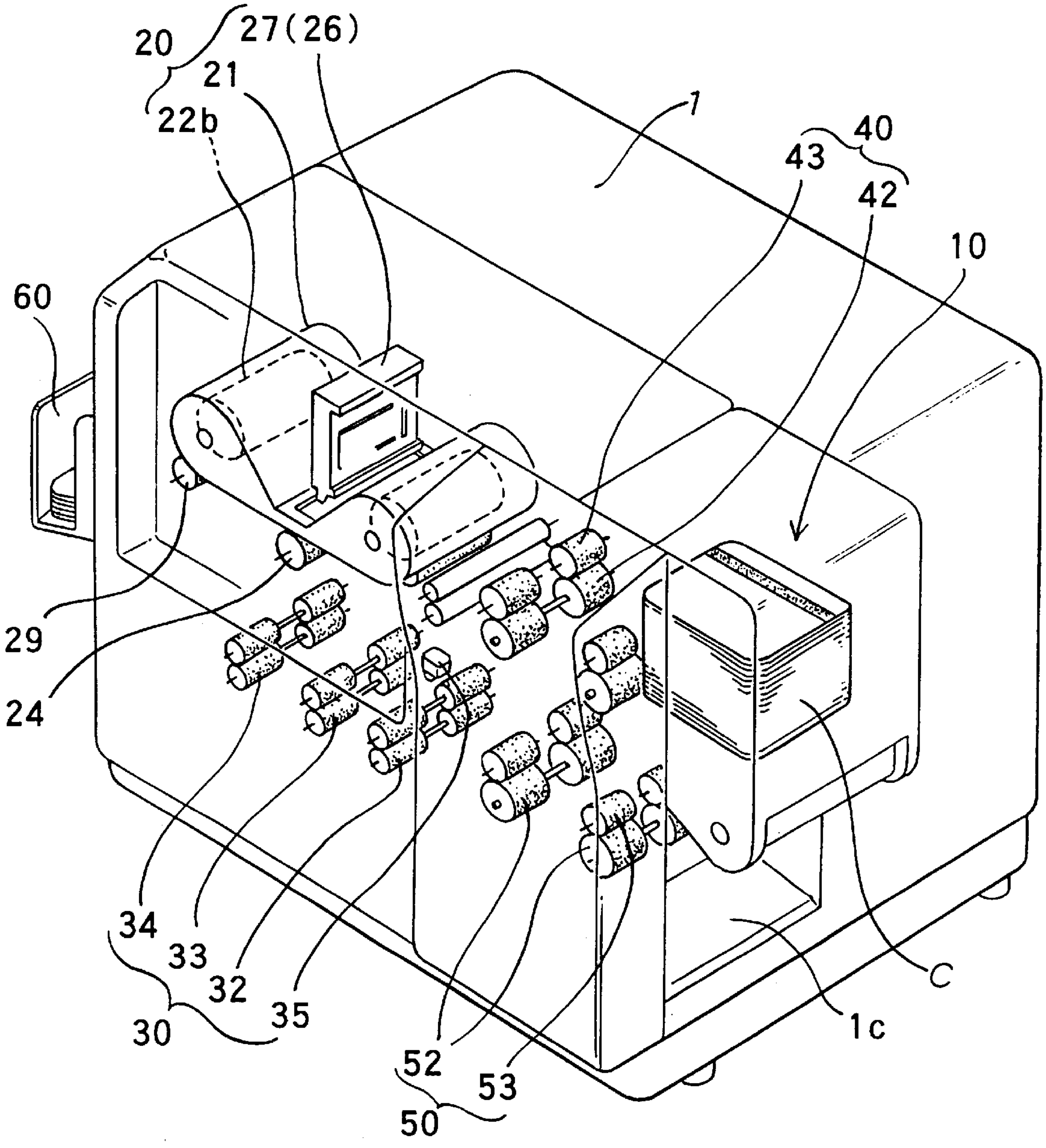
FIG. 1 is a perspective view showing one embodiment of an information card producing device according to this invention.

One embodiment of this invention will be described with reference to FIG. 1 and FIG. 2. A device having functions of printing visible data such as letters, patterns and photographs on at least one surface of a card base and writing magnetically-coded data to a magnetic stripe formed on one surface of the card base is proposed herein as one example.

The information card producing device of this embodiment comprises a casing 1 having a card supply port 1*a* formed in a card supply side wall, a card discharge port 1*b* formed in a card discharge side wall opposite to the card supply side wall, and a card reject port 1*c* formed below the card supply port 1*a*; a card supply portion 10 fitted to the card supply port 1*a* formed in the casing 1 for supplying one by one blank cards C stacked therein; a recording portion REC having a first recording unit 20 having a thermal transfer printer for printing the aforenoted visible data on at least one surface of a given card, and a second recording unit

30 including a magnetic encoder for writing the aforenoted magnetically-coded data on a magnetic stripe formed on at least one surface of the given card; and a card transfer portion TRN interposed between the card supply portion 10 and the recording portion REC.

The card supply portion 10 in which the multiple blank cards are contained comprises a stacker 12 having a card exit 14 having an opening height slightly larger than the thickness of the card base, and a kick roller 16 disposed in the bottom of the stacker 12. By rotating the kick roller 16, only the lowermost of the blank cards stacked in the stacker 12 is permitted to pass through the card exit 14 and sent out to the card transfer portion TRN.

Along a substantially straight line extending from the card exit 14 of the card supply portion 10 fitted to the card supply port 1*a* to the card discharge port 1*b* of the casing 1, there is defined is a first feeding path P1.

In the illustrated embodiment, a second feeding path P2 extending through the card reject port 1*d* beneath the first feeding path P1 is arranged in substantially parallel to the first feeding path P1. However, these feeding paths P1 and P2 are not necessarily formed of horizontal, straight and parallel lines.

Thus, in the recording portion REC, the first recording unit 20 arranged on the first feeding path P1 and the second recording unit 30 arranged on the second feeding path P2 are disposed one over another in the vertical direction.

The first recording unit 20 in this embodiment is formed of a thermal transfer printer using a thermal transfer ink ribbon suitable for printing visible data such as letters, images and photographs on the surface of the card.

Although a thermal wax-transfer printer using a monochromatic (black in general) thermal wax-transfer ink ribbon is suitable for printing two-gradation images such as letters and bar code patterns, and a dye-sublimation type printer using a multi-color (yellow, magenta, cyan and black in general) thermal dye-sublimation ink ribbon is suitable for printing multi-gradation images such as full color photographs, the type of the printer is not specifically limited in the invention. Furthermore, in any case, the ink ribbon may arbitrarily include not only printing ink, but also a thermal transfer protective film for protecting the printed surface of the card, and/or hologram image film.

Figure 3:
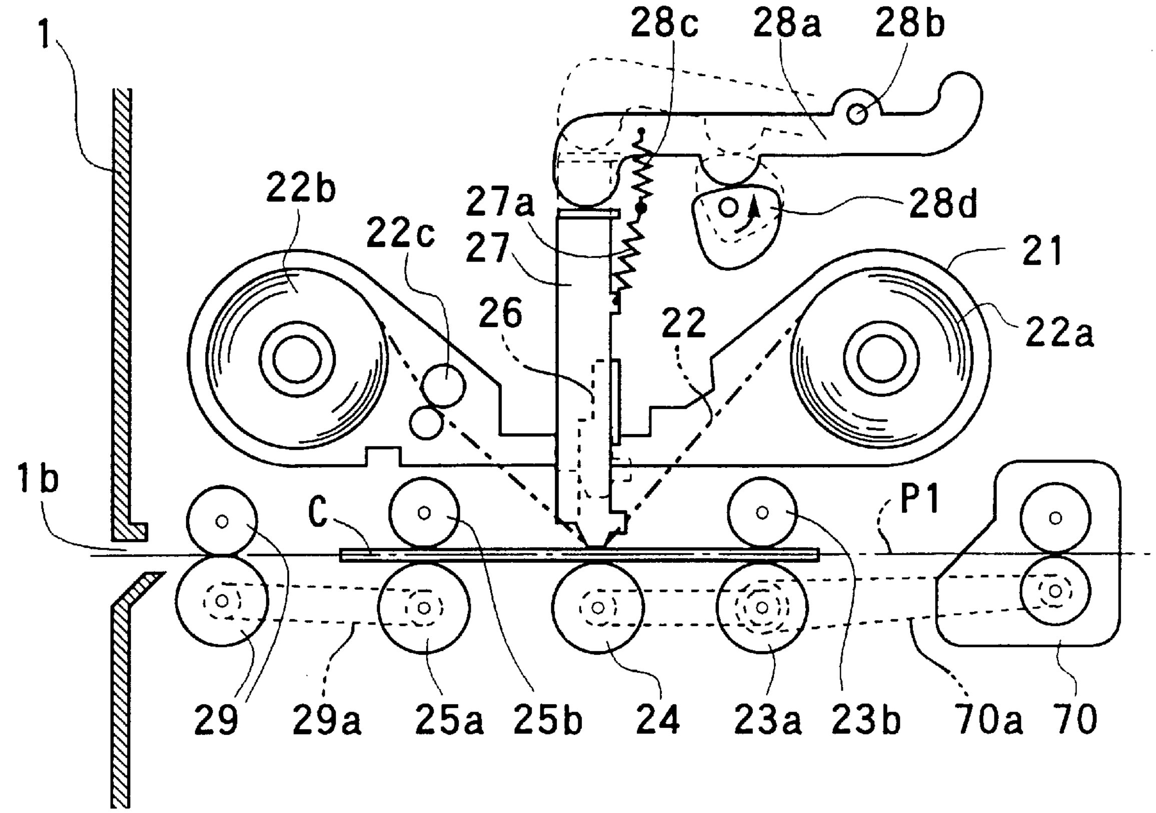
FIG. 3 is a front view schematically showing a printing portion.

As schematically illustrated in FIG. 3, the printer (first printing unit 20) comprises an ink ribbon cartridge 21 containing a thermal transfer ink ribbon 22, paired capstan roller 23*a* and pinch roller 23*b*, a platen roller 24, paired capstan roller 25*a* and pinch roller 25*b*; a thermal head 26 supported by a head holder 27 opposed to the platen roller 24, and a head driving mechanism 28 for vertically moving the head holder 27. These rollers are arranged along the first feeding path P1.

The ink ribbon 22 in the ribbon cartridge 21 is unwound from a supply roll 22*a* and wound up around a winding roll 22*b*.

Figure 6:
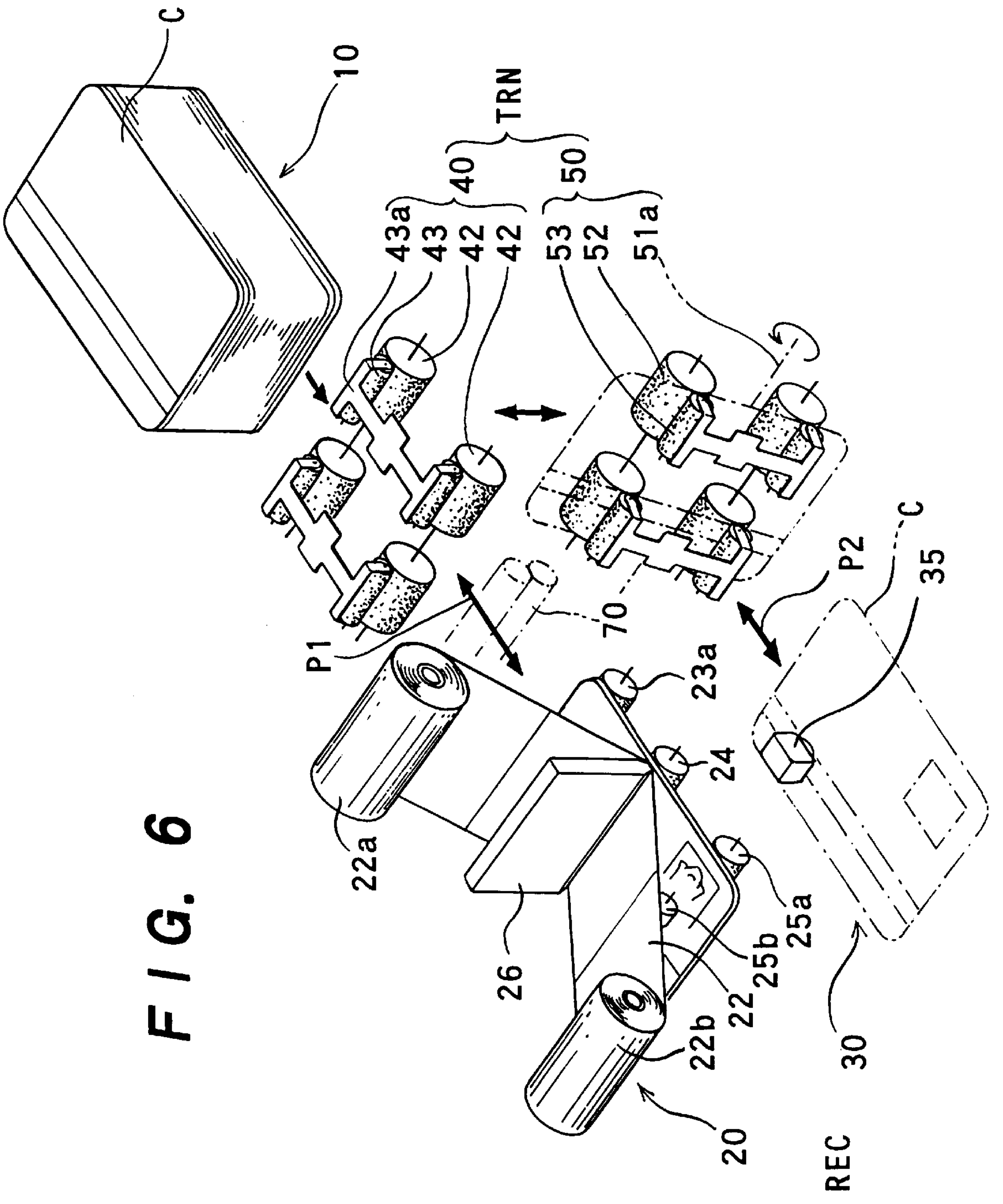
FIG. 6 is a schematic perspective view illustrating the operation of the principal portion of the first embodiment.

In printing a color image, the ink ribbon formed by applying dye-sublimation inks of different colors onto a ribbon base so as to form ink frames each having an area substantially equal to the surface of the card base to be subjected to printing, as schematically illustrated in FIG. 6.

In the drawings, components 22*c* are guide rollers for the ink ribbon.

The thermal head 26 is provided at its leading end (lower end in the drawing) with a plurality of heating elements arranged in array. The ink applied to the ink ribbon 22 ran be thermally transferred to the surface of the card by selectively driving the heating elements of the thermal head in such a state that the thermal head comes into contact with the surface of the card C through the thermal transfer ink ribbon 22. By successively moving the card and the ink ribbon in the feeding direction while controlling heating operation of the heating elements of the thermal head, a desired image can be formed on the surface of the card.

A vertical moving system for the thermal head 26 which includes the head driving mechanism 28 serves to bring the thermal head 26 into contact with the surface of the card through the ink ribbon 22 only when printing on the card.

The thermal head vertically-moving system is so constructed that the head holder 27 is constantly urged upward by means of a spring 27*a*, and pressed downward by a press lever 28*a* when printing, as shown in FIG. 3.

The press lever 28*a* pivoted on a shaft 28*b* is energized toward the upper end of the head holder 27 by a spring 28*c* while being in contact with a cam 28*d*. Thus, when the press lever 28*a* comes into contact with the major diameter part of the cam 28*d*, the tip end of the lever 28*a* is out of contact with the head holder 27 to permit the head holder 27 to assume its upper dead point, but when the cam 28*d* rotates to bring the press lever 28*a* into contact with the minor diameter part of the cam 28*d*, the tip end of the lever is brought into press contact with the upper end of the head holder 27 to move the head holder 27 downward against the spring 27*a*, thus pressing the thermal head 26 against the platen roller 24.

Accordingly, by controlling the rotation of the cam 28*d* in accordance with the operation or non-operation for printing, the thermal head 26 causes the ink ribbon 22 to come into press contact with or be separated from the card C.

In the drawings, reference numeral 29 denotes a pair of discharge rollers confronting the card discharge port 1*b* and disposed behind the capstan roller 25*a* so as to send out adequately finished cards through the card discharge port 1*b*. The discharge rollers 29 are connected with the capstan roller 25*a* through rotation transmitting means 29*a* such as a timing belt so as to be driven in conjunction with the capstan roller (FIG. 3).

Reference numeral 60 denotes a discharge stacker for receiving the finished cards discharged through the card discharge port 1*b*.

Disposed on the first feeding path P1 between the first card turning portion 40 and the first recording unit 20 is cleaning means 70 formed of paired cleaning rollers for cleaning at least one surface of the card.

The cleaning rollers of the cleaning means 70 may be driven in conjunction with the capstan roller 23 of the first recording unit 20 through rotation transmitting means 70*a* such as a timing belt. This cleaning means is commonly known in this field of art and should not be understood as limitative because it is not indispensable constituent of this invention. Therefore, this means is not in detail explained here.

The magnetic encoder is adopted in this embodiment as the second recording unit 30 for magnetically recording information data on a magnetic stripe formed on one surface of the card serving as a recording medium. However, if an IC card is dealt with by the device of this invention, an IC memory reader/writer for electronically recording the data to a built-in IC memory may be employed instead of the magnetic encoder. Also, the IC memory reader/writer may be used together with the magnetic encoder as required.

Figure 2:
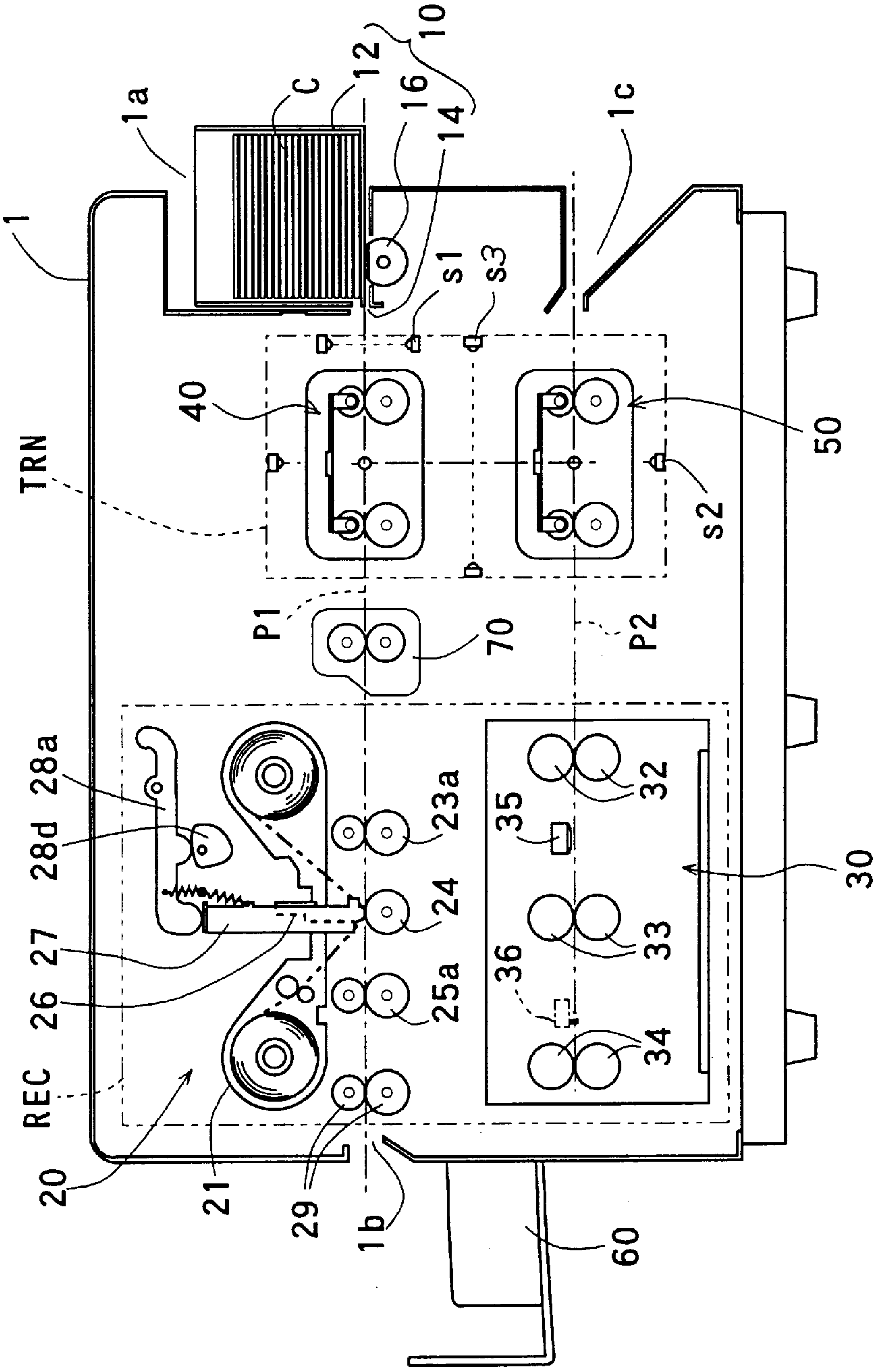
FIG. 2 is a front sectional view schematically showing the device of FIG. 1.

In the case of using the magnetic encoder as the second recording unit, a plurality of feeding rollers 32 to 34, and a magnetic head 35 between the rollers 32 and 33 may be arranged along the second feeding path P2 as schematically shown in FIG. 2.

In the case of using the IC memory reader/writer, there may be disposed a reading/writing contact means capable of being contacted to terminals of the IC card along the second feeding path P2, as depicted by an imaginary line in FIG. 2. Since the magnetic encoder and IC memory reader/writer for writing information data to various cards are known in this field of art, these are not in detail explained here.

The aforementioned magnetic encoder or IC memory reader/writer for recording magnetically-coded information data or digital information data on the card by use of the magnetic head 35 or contact means 36 are commonly controlled by an electronic control system for writing information data, which is incorporated in the device of this invention, though not illustrated specifically. The control system has a function of executing a writing operation as well as verifying whether data to be written to the card and data read from the card are agreed, consequently to detect a faulty card causing write error.

The card transfer portion TRN for transferring the card between the first recording unit 20 and the second recording unit 30 includes a first card turning portion 40 confronting the first recording unit 20 on the first feeding path P1, and a second card turning portion 50 confronting the second recording unit 30 on the second feeding path P2.

Since these card turning portions 40 and 50 are substantially identical with each other, a detailed explanation on the first turning portion 40 will be specifically given here.

Figure 4:
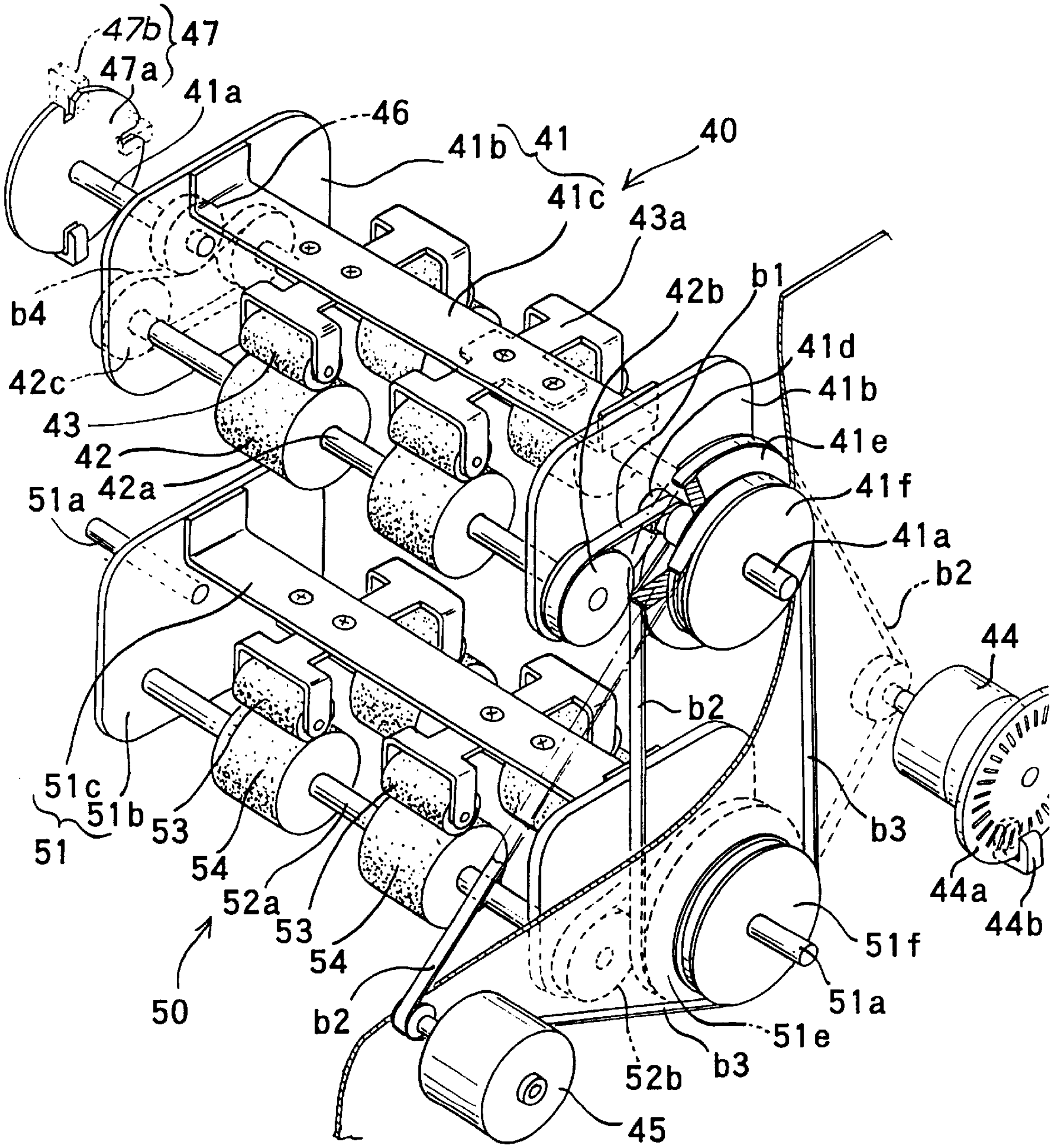
FIG. 4 is a partially sectioned perspective view of a card transfer portion.

As shown in FIG. 4, the turning portion 40 comprises a rotating frame 41 having opposite frame plates 41*b* each having a rotating shaft 41*a* pivotally supported by the base plate 2 fixed onto the casing 1, and connecting members 41*c* for the opposite frame plates 41*b*; feeding rollers 42 supported by two roller shafts 42*a* supported between the opposite frame plates 41*b*; and press rollers 43 rotatably supported by elastic members 43*a* retained by the aforesaid connecting members 41*c* so as to come into elastic contact with the feeding rollers 42.

The feeding roller 42 and press roller 43 are in contact with each other on the first feeding path P1 (rollers of the second card turning portion 50 are in contact with each other on the second feeding path P2) as shown in FIG. 2, so that the card C is elastically pinched between the feeding rollers 42 and the press rollers 43, thus stably transferring the card C by the rotation of the feeding rollers 42.

One of the roller shafts 42*a* for supporting the feeding rollers 42 is provided at its one end with a rotary pulley 42*b* which is connected to a minor pulley 41*d* freely rotatably supported by the rotating shaft 41*a* through a timing belt (toothed transmission belt) b1.

The minor pulley 41*d* is coupled with a major pulley 41*e* freely rotatably supported by the rotating shaft 41*a* as well. By transmitting the rotation generated by a feeding motor 44 to the major pulley 41*c* through a timing belt b2, the feeding rollers 42 are caused to rotate (rotation round their own axes), consequently moving the card C in one direction.

Figure 5A:
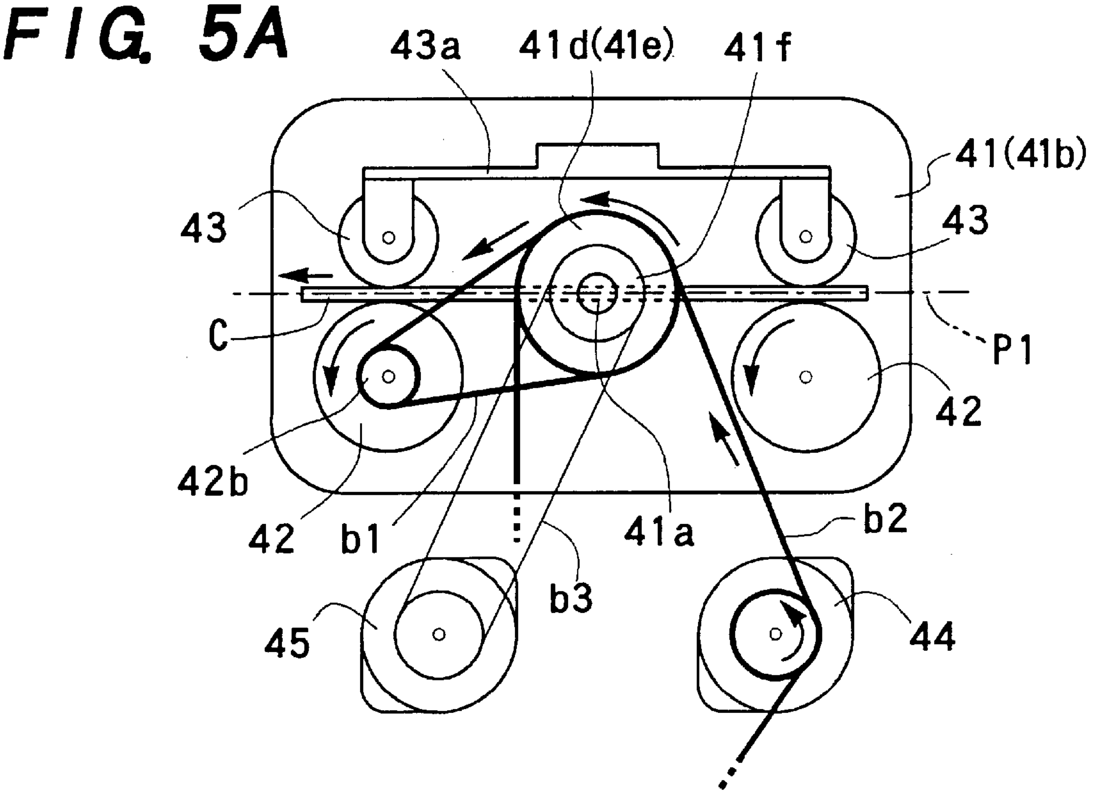
FIG. 5A and FIG. 5B are schematic front views illustrating the operation of card turning means.
Figure 5B:
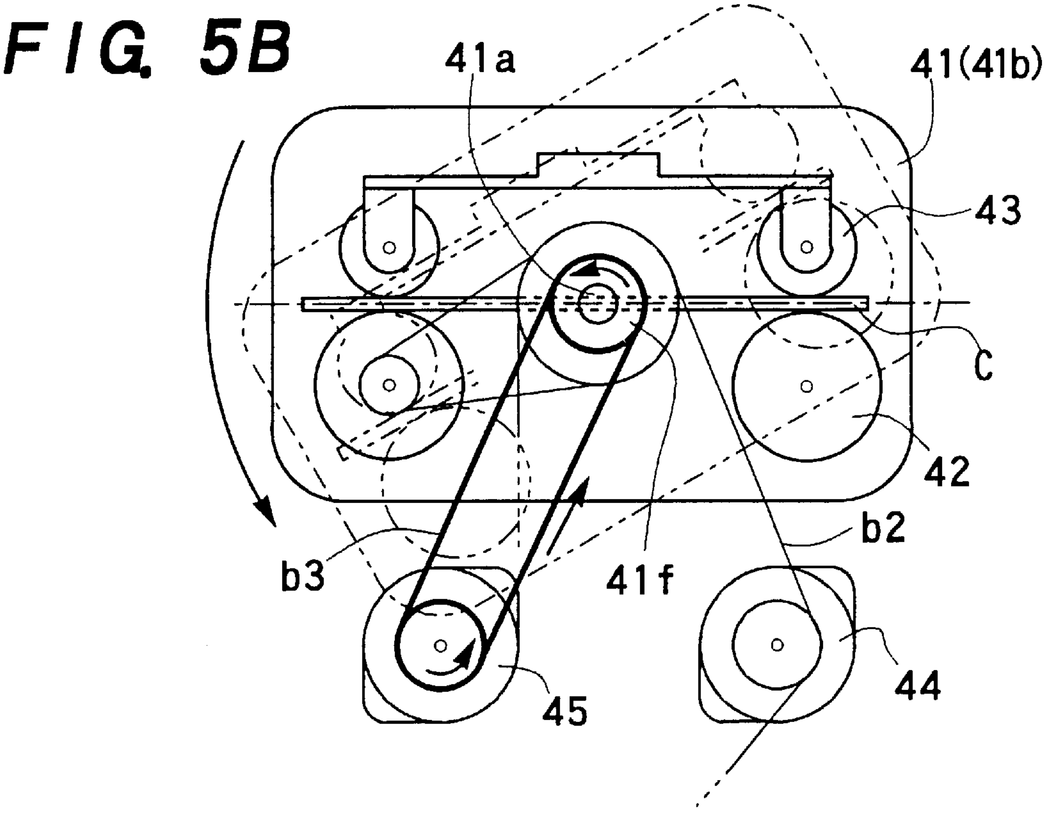

On the other hand, a pulley 41*f* fixed to the rotating shaft 41*a* located on the first feeding path P1 is connected to a revolving motor 45 through a timing belt b3, so that the rotating frame 41 rotates around the rotating shaft 41*a* by driving the revolving motor 45, as conceptually illustrated in FIG. 5B, as a result of which the feeding rollers 42 revolves round the rotating shaft 41*a*. That is, the card C held by the rollers 42 and 43 rotates about the shaft 41*a*.

Between the minor pulley 41*d* and the major pulley 41*e* fixed on the rotating shaft 41*a*, there is interposed a one-way clutch (not shown) for transmitting the rotation only from the major pulley 41*e* to the minor pulley 41*d* in one direction (counterclockwise in FIG. 5A) so as to rotate the feeding rollers 42 in one direction (card forwarding direction) through the pulleys in accordance with the rotation in one direction of the feeding motor 44. Consequently, when the rotating frame 41 rotates as shown in FIG. 5B (revolution of the feeding rollers 42 around the shaft 41*a*), the major pulley 41*a* restrained by the belt b2 connected to the motor 44 rotates in the reverse direction relative to the rotating frame 41. However, since the minor pulley 41*d* rotates in concert with the rotating frame 41 to negate the relative rotation of the major pulley 41*e*. As a result, the card held between the rollers 42 and 43 is prevented from being dislocated during the rotation of the rotating frame 41 and held at an adequate position.

Thus, the feeding motor 44 and the revolving motor 45 may rotate merely in one direction as described above.

Although the lower second card turning portion 50 is omitted from FIGS. 5A and 5B for the sake of simplicity in description, a pulley 51*e* for permitting feeding rollers 54 to rotate in the second turning portion is rotated by the motor 44 through the timing belt b2 in concert with the pulley 41*e* in the first turning portion, and similarly, a pulley 51*f* for rotating the rotating frame 51 in the second turning portion to permitting the feeding rollers 54 to rotate around a shaft 51*a* is driven by a motor 45 through the timing belt b3 in concert with the pulley 41*f* in the first turning portion.

The motor 44 is provided with rotation detecting means composed of a clock plate 44*a* and a sensor 44*b*. The clock plate 44*a* is retained on the rotating shaft of the motor 44 and has a plurality of radial slots spaced equally in the circumferential direction.

The clock sensor 44*b* is formed of an optical sensor such as a photo-coupler capable of optically detecting the aforesaid slots, thereby issuing clock pulse signals. Thus, the turning angle and speed of the motor 44 can be calculated by counting the clock pulse signals issued from the clock sensor 44*b* in synchronism with the rotation of the motor 44, so that the feeding amount and speed of the card transferred by the rollers 42 can be accurately recognized and controlled.

Transmission rollers 42*c* respectively mounted on one end of each of the roller shafts 42*a* are joined with each other through a timing belt b4, so that the feeding rollers 42 supported by the roller shafts 42*a* can rotate in harmony with one another. The timing belt b4 is strained to maintain moderate tension by an idle pulley 46 freely rotatably supported by the turning shaft 41*a* retained on one of the frame plates 41*b*.

Mounted on the rotating shaft 41*a* of one of opposed frame plates 41*b* (on the side on which the idle pulley 46 is disposed in the illustrated embodiment) is a rotational angle detecting means 47.

The rotational angle detecting means 47 comprises an angle plate 47*a* provided in its peripheral edge with three angle makers (notches) formed at right angles to adjoining ones, and three sensors (photo-couplers for optically detecting the angle markers in this embodiment) 47*b* placed at right angles to adjoining ones on the peripheral edge of the angle plate 47*a*. By checking whether any of the sensors detects the angle maker, the posture angle of the rotating frame 41 can be recognized.

As an example, in the rotational angle detecting means having the sensors 47*b* placed at the upper and lower positions and one of the horizontal positions of the angle plate as shown in FIG. 4, when all the outputs of the sensors 47*b* are "ON", the rotating frame 41 assumes its horizontal posture, and when one of the upper and lower sensors 47*b* is in the "OFF" state, the rotating frame 41 assumes one of its vertical postures. When the horizontal sensor is in the "OFF" state, the rotating frame 41 is deemed to assume the reverse horizontal posture (upside down state).

A rotation/revolution driving mechanism for the feeding rollers 52 of the second turning portion 50 is substantially the same as that of the first turning portion 40 except for the aforementioned rotational angle detecting means 47 which is unnecessary for the second turning portion 50.

To put it concretely, the second turning portion 50 comprises a rotating frame 51 having opposite frame plates 51*b* each having a rotating shaft 51*a*, and connecting members 51*c* for the opposite frame plates 51*b*; transmission system including pulleys 51*e*, 51*f* and 52*b* and timing belts b1, b2 and b3; feeding rollers 52 supported by two roller shafts 52*a* supported between the opposite frame plates 51*b*; and press rollers 53. These elements have substantially the same functions and effects as the corresponding ones in the first turning portion 40.

Figure 7:
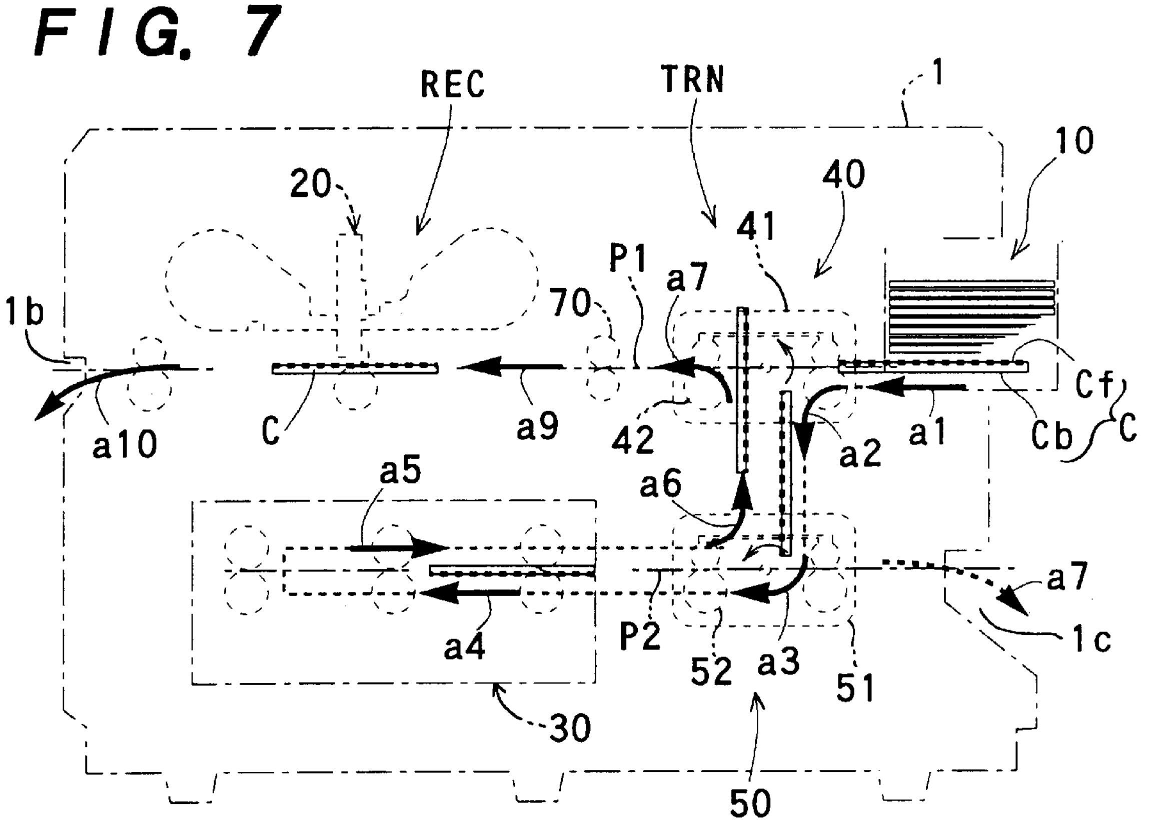
FIG. 7 is a schematic front view showing a process in which the card is transferred in the first embodiment.
Figure 8:
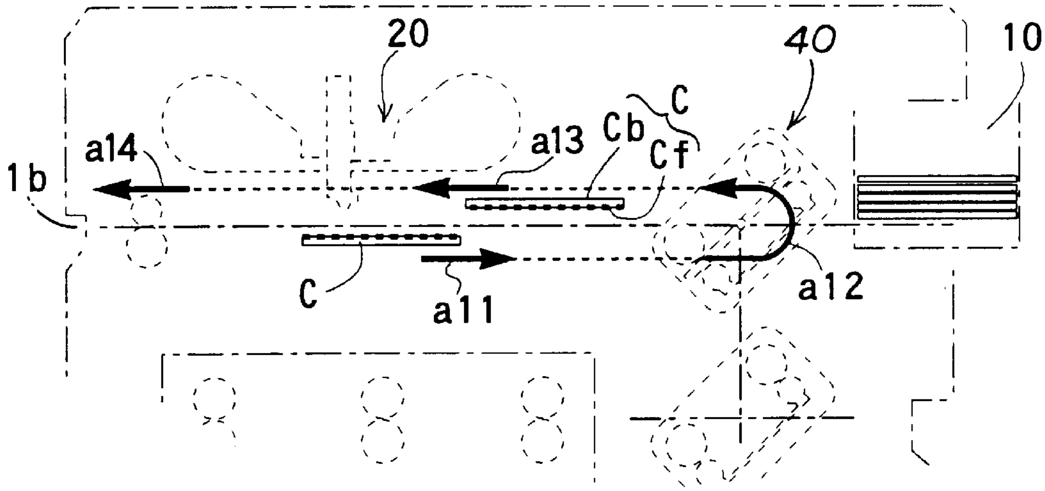
FIG. 8 is a schematic front view showing a selectively supplementary process in FIG. 7.

The pulleys 51*e*, 51*f* and 52*b* are driven to rotate by the respective timing belts b1, b2 and b3 in synchronism with the pulleys 41*e*, 431*f* and 42*b* of the first card turning portion 40, with the result that the rotating frames 41 and 52 of the first and second turning portions 40 and 50 assume the same rotational posture synchronously (see FIG. 7 and FIG. 8).

In order to perceive the state of the card to be processed in the card transfer portion TRN, there are used a plurality of card sensors s1, s2 and s3. Each card sensor is a photoelectric sensor formed of a light emitting element and a photo detecting element which are opposed to each other astride the card path.

The first card sensor s1 is positioned confronting the card exit 14 of the card supply portion 10, the elements of the second card sensor s2 are positioned facing each other with the first and second card turning portions 40 and 50 between them, and the third card sensor s3 is positioned between the first and second card turning portions 40 and 50. By means of these card sensors, any failure to transfer the card in the card transfer portion TRN can be detected.

In the information card producing device constructed as mentioned above, the blank card sent out from the card supply portion 10 is fed to one of the first and second recording units 20 and 30 according to the purpose, and further, turned over or transferred from one of the recording units to the other recording unit according to circumstances, consequently to complete the desired information card.

An example in which the card is first sent to the second recording unit 30 to be magnetically and/or digitally recorded with information data, and then, transferred to the first recording unit to be printed will be described with reference to FIG. 6 and FIG. 7.

As indicated by the arrow a1 in FIG. 7, one card C is sent out from the card supply portion 10 into the first feeding path P1. The card C thus sent out is forwarded into and held between the feeding rollers 42 and the press rollers 43 of the rotating frame 41 of the first card turning portion 40 in the card transfer portion TRN. In this state, the obverse Cf (surface with "dots" in the drawings) of the card faces upward, and the reverse Cb faces downward.

Next, the rotating frames 41 and 51 of the first and second card turning portions with the card C held between the rollers are driven to make a quarter turn (rotation of 90 degrees) in the counterclockwise direction, causing the card to assume its vertical posture (arrow a2), and then, the feeding rollers 42 and 52 are rotated to move the card from the first tuning portion 40 to the second turning portion 50. When the card reaches the second turning portion 50, the rotating frames 41 and 51 are again rotated counterclockwise one-fourth of a rotation, thereby causing the card to assume its horizontal posture (arrow a3). Then, the card is sent into the second recording unit 30 through the second feeding path P2 (arrow a4). At this time, the card is in the state turned upside down relative to that stacked in the card supply portion 10.

If the card is required to face the obverse Cf upwards in the second recording unit 30, the rotating frame 51 with the card held is rotated three-fourth of a rotation (rotation of 270 degrees).

Upon completion of writing of desired information data to the card in the second recording unit 30, the information data recorded to the card may be verified as required.

The card to which the information date are recorded in the second recording unit 30 is sent back toward the second card turning portion 50 through the feeding path P2 (arrow a5).

If a fault of writing the information data to the card in the second recording unit 30 is found as the result of verification, the feeding rollers 52 are continuously rotated to send out the faulty card through the card reject port 1*c* (arrow a7), without rotating the second turning portion 50.

The card adequately recorded is sent to the first turning portion 40 and turned by rotating the rotating frame 41 one-fourth of a rotation (arrow a8), and then, sent to the first recording unit 20 through the first feeding path P1 (arrow a9).

After subjecting the card C sent to the first recording unit 20 to desired printing, the card is sent out through the card discharge port 1*b* (arrow 10).

In the manner as described above, the desired images are printed on the obverse Cf of the card, but if printing on the reverse of the card is required, the first card turning portion 40 may rotate three-fourth of a rotation (rotation of 270 degrees) before sending out the card to the first recording unit 20.

When requiring printing on not only the obverse but also the reverse Cb in the first recording unit 20, as illustrated in FIG. 8, the card which has been subjected to printing on the obverse may be returned to the first turning portion 40 (arrow a11), rendered a half turn (rotation of 180 degrees) in the first turning portion (arrow a12), again forwarded to the first recording unit 20 (arrow a13), and sent out through the card discharge port 1*b* upon printing on the reverse Cb (arrow a14).

Figure 9:
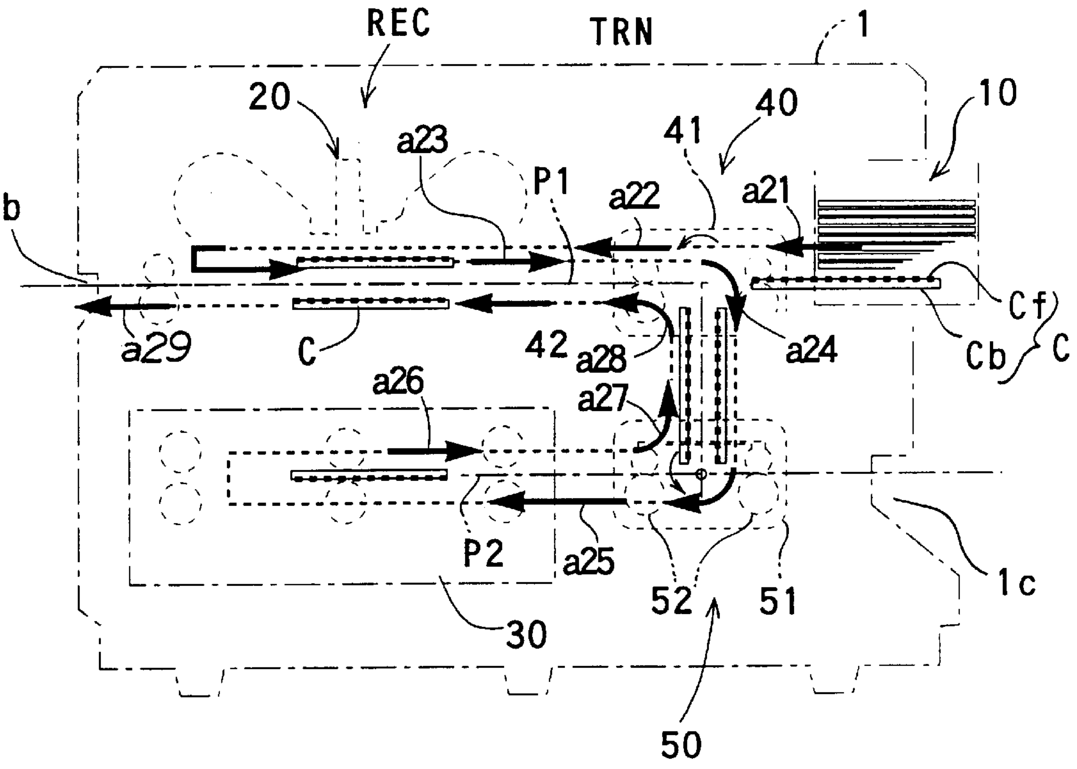
FIG. 9 is a schematic front view showing another process in which the card is transferred in the first embodiment.
Figure 10:
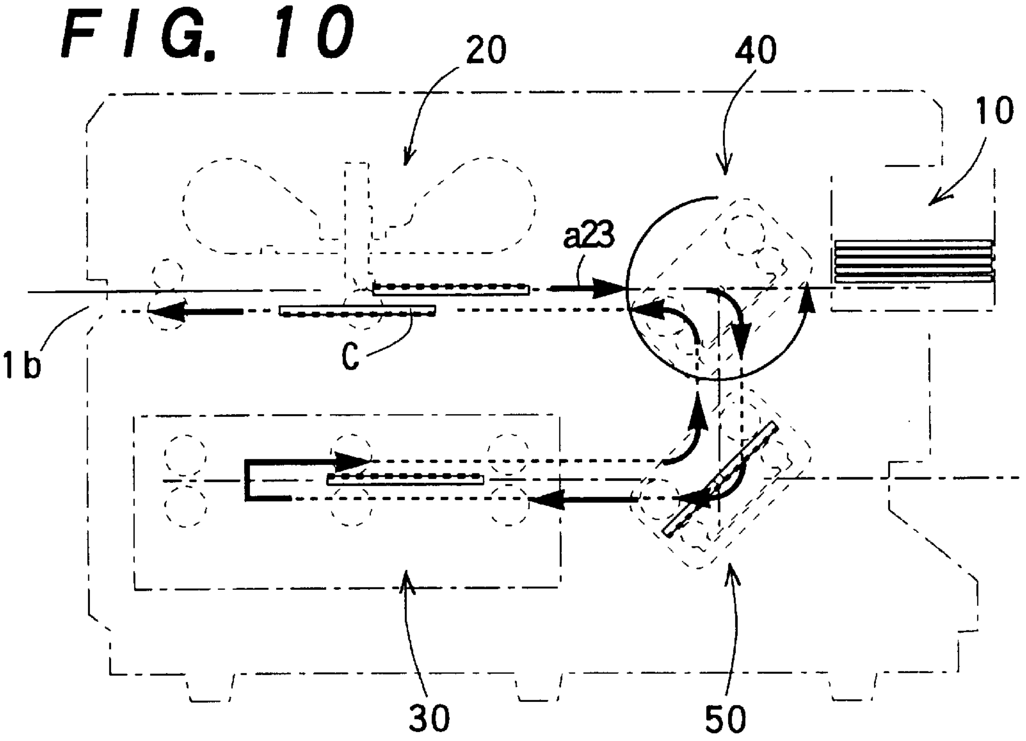
FIG. 10 is a schematic front view showing a selectively supplementary process in FIG. 9.

FIG. 9 shows another card transferring manner in which the card moves along the course: Card supply portion 10—(arrow a21)—first card turning portion 40—(arrow a22)—first recording unit 20—(arrow a23)—first card turning portion 40—(arrow a24)—second card turning portion 50—(arrow a25)—second recording unit 30—(arrow a26)—second card turning portion 50—(arrow a27)—first card tuning portion 40—(arrow a28)—first recording unit 20—(arrow a29)—card discharge port 1*c*. As a result, the desired recorded card can be obtained. Each time the card reaches the first and second card turning portions 40 and 50, the rotating frames of these portions are rotated one-fourth of a rotation, so that the card is subjected to printing on its obverse in the first recording unit, and then, magnetically recording on its reverse in the second recording unit.

When the card is transferred from the first recording unit 20 to the first card turning portion 40 in the card transferring process in FIG. 9 (arrow a23), by turning the first turning portion 40 three-fourth of a rotation (rotation of 270 degrees), desired printing on the reverse of the card can be performed in the second recording unit 30 and the first recording unit 20.

Thus, in either of the first recording unit 20 and the second recording unit 30, the desired information data can be recorded on the intended surface of the card by sending and/or turning the card in the card turning portions at pleasure.

As is apparent from the foregoing description, since the plurality of information recording units including a printer and/or magnetic encoder are vertically arranged one on top of another in the device of the invention, the constituent components of the device can be rationally integrated. Besides, since the device of the invention is provided with the card transfer portion having the card turning portions capable of turning the card without dislocating the card to be transferred, the card can be stably and reliably transferred to the recording units arranged vertically, and turned over for the purposes.

Figure 11:
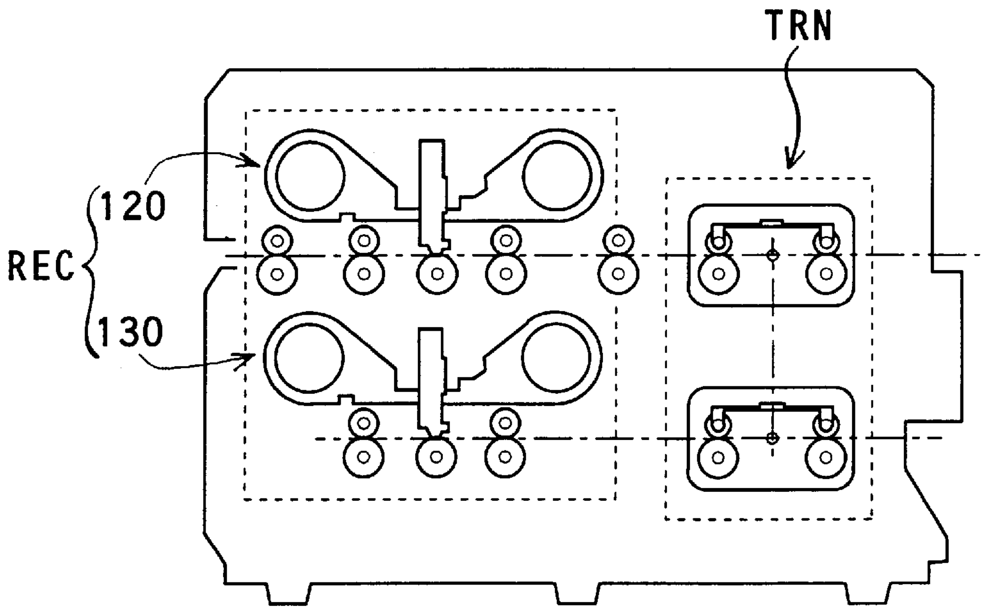

The recording portion REC in the aforesaid embodiment is composed of the printer (first recording unit 20) and the magnetic encoder (second recording unit 30), whereas it may be formed of printers for the first recording unit 20 and second recording unit 30 as shown in FIG. 11.

That is, as one example, a dye-sublimation type printer using a thermal dye-sublimation ink ribbon suitable for printing multi-gradation images such as full color photographs may be used as a first recording unit 120, and a thermal wax-transfer printer using a thermal wax-transfer ink ribbon suitable for printing two-gradation images such as letters may be used as a second recording unit 130.

In the case of using the thermal transfer printers as the first and second recording units, the first and second recording units may have the substantially same structure as the printer of the first recording unit 20 in the first embodiment schematically shown in FIG. 3. As well, other elements and components including the card transfer portion TRN are the same as the corresponding ones in the aforementioned first embodiment.

Figure 12:
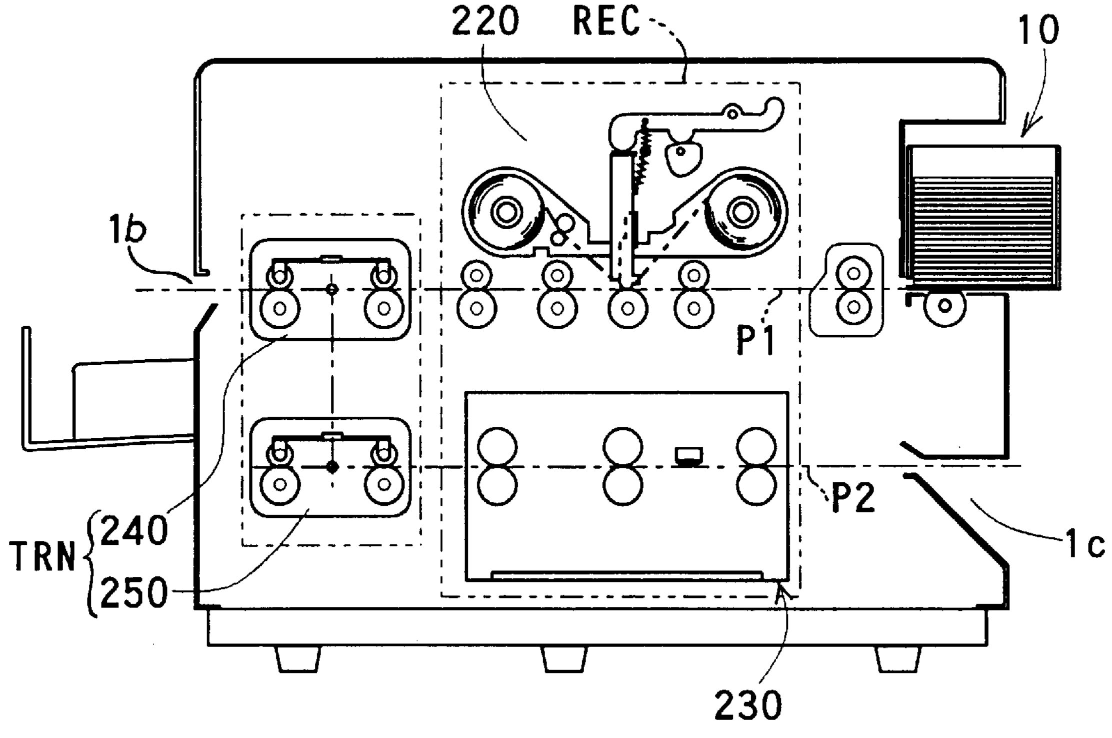
FIG. 12 is a front view schematically showing a second embodiment of this invention.

FIG. 12 shows still another embodiment in which the card transfer portion TRN is disposed on the side of the card discharge port 1*b*, so that the recording portion REC is interposed between the card transfer portion TRN and the card supply portion 10. Other elements are substantially identical in structure and function with the corresponding ones in the aforenoted first embodiment. That is, the recording portion REC is formed by vertically arranging a first recording unit 220 on the first feeding path P1 and a second recording unit 230 on the second feeding path P2 one on top of another. The card transfer portion TRN is formed of a first card tuning portion 240 which is disposed along the first feeding path P1 and confronts the first recording unit 220, and a second card turning portion 250 which is disposed along the second feeding path P2 and confronts the second recording unit 230.

Figure 13:
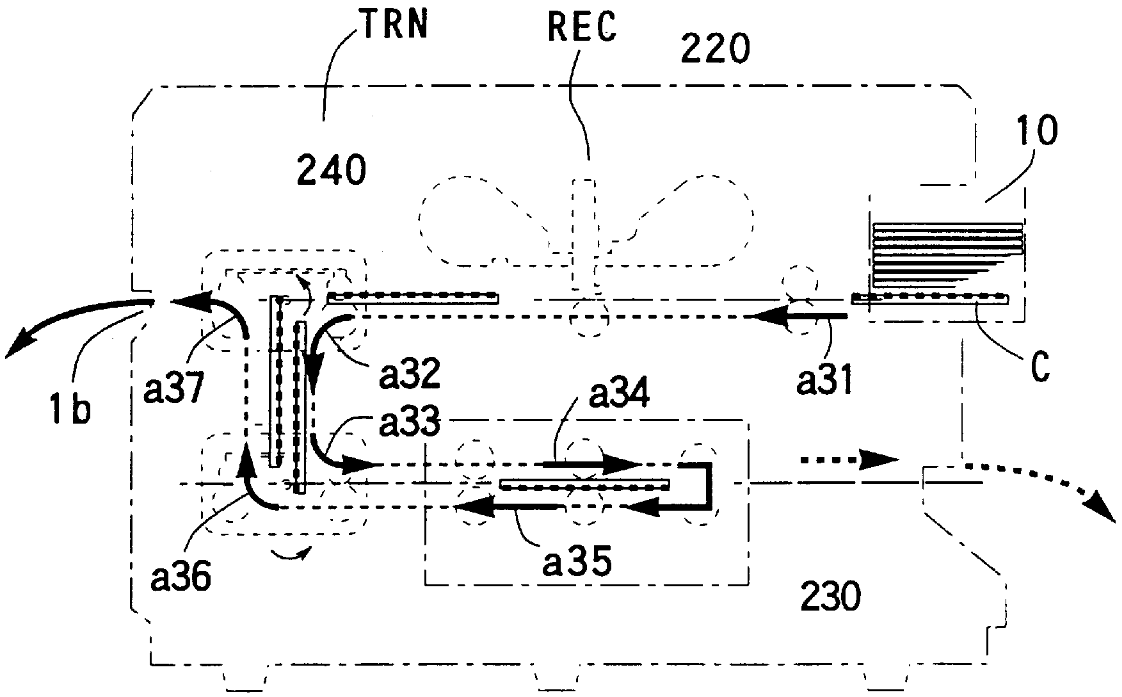
FIG. 13 is a schematic front view showing a process in which the card is transferred in the device of FIG. 12.

One example in which the card is transferred in the embodiment shown in FIG. 12 is illustrated in FIG. 13. The card C to be processed is first sent out from the card supply portion 10 to the first recording unit 220 (arrow a31), turned one-fourth of a rotation in the first card turning portion 40 after printing on the obverse of the card (arrow a32), and then, transferred to the second card turning portion 50. The card is further turned one-fourth of a rotation in the second card turning portion 50 (arrow a33), and forwarded to the second recording unit 230 (arrow a34).

The card processed in the second recording unit 230 is sent back in the reverse order (a35 to a36), and forwarded from the first turning portion 240 to the card discharge port 1*b* (arrow a37).

Figure 14:
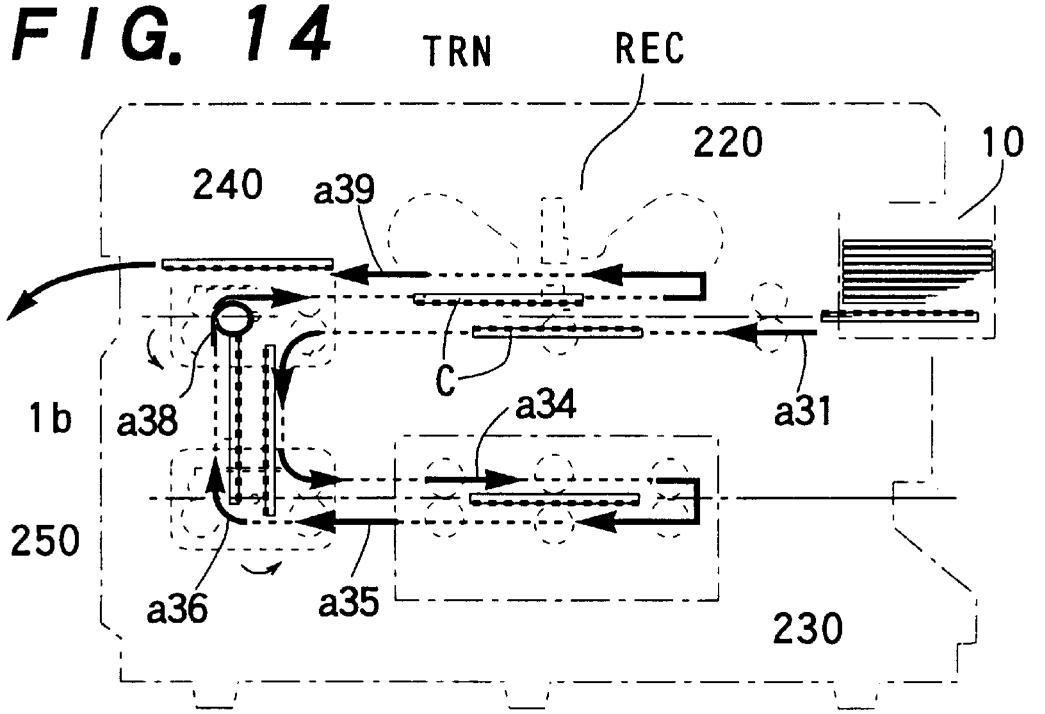
FIG. 14 is a schematic front view showing another process in which the card is transferred in the device of FIG. 12.

When the card is sent from the second turning portion 250 to the first turning portion 240 (arrow a36) in the process shown in FIG. 13, the card C is sent back to the first recording unit 220 with the reverse surface upward by turning the first turning portion 240 three-fourth of a rotation (rotation of 270 degrees) (arrow a38 in FIG. 14).

Thereafter, upon printing on the reverse of the card C, the card is sent out through the first tuning portion. (arrow a39).

Figure 15:
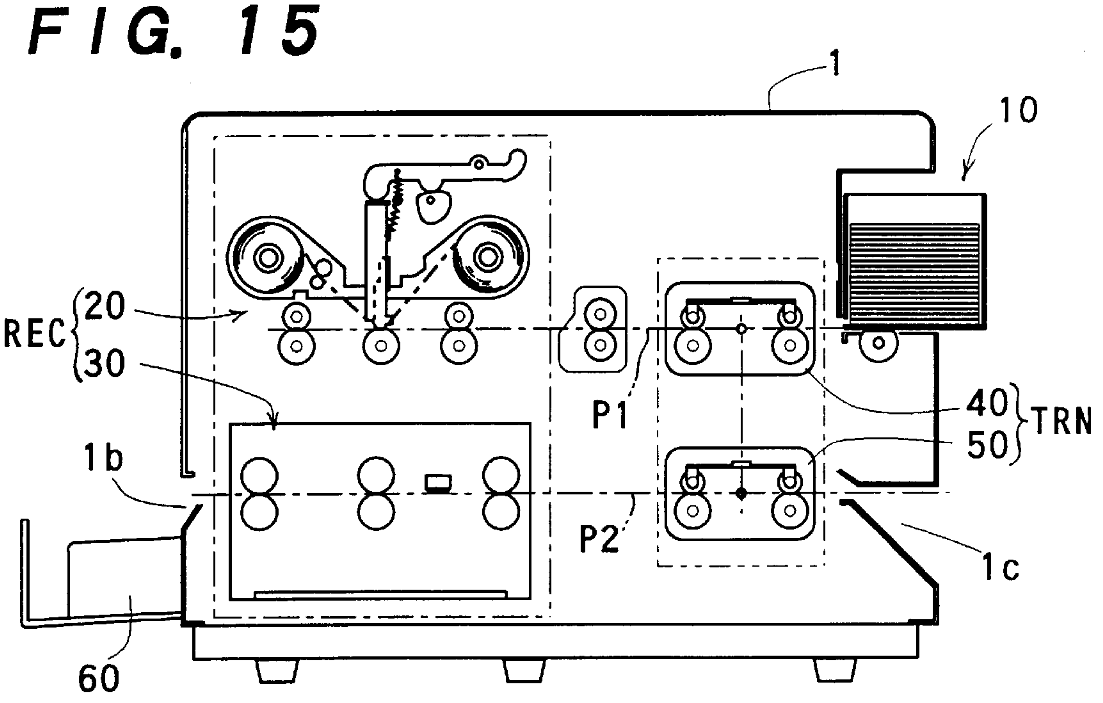
FIG. 15 is a front view schematically showing a third embodiment of this invention.
Figure 16:
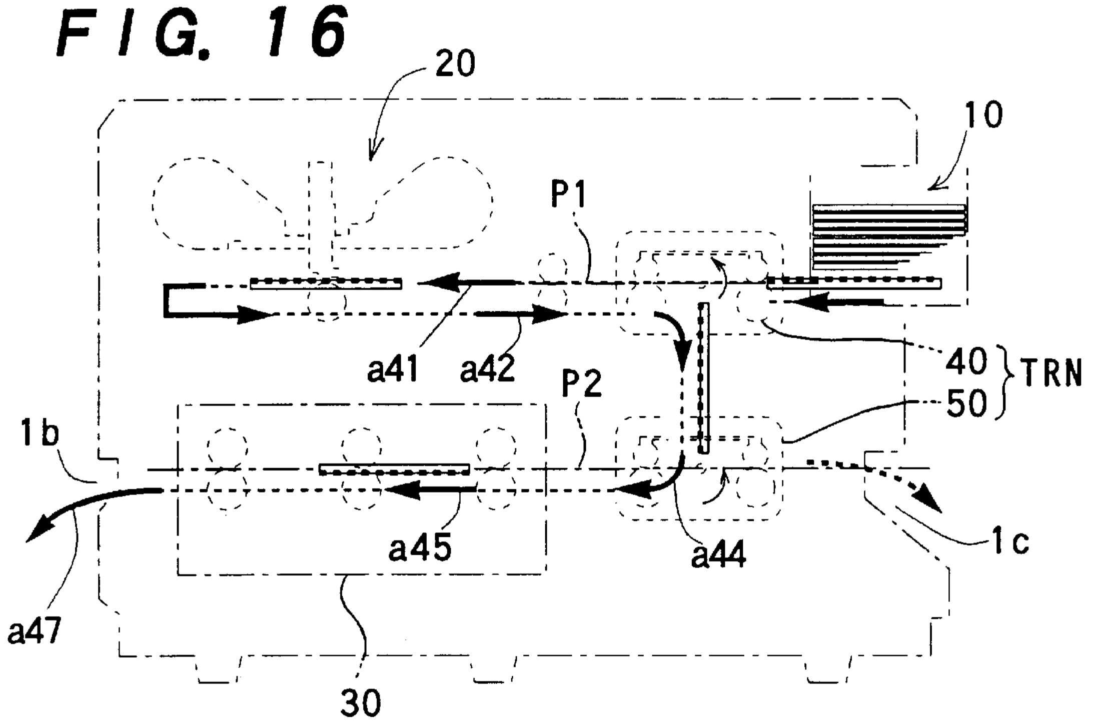
FIG. 16 is a schematic front view showing a process in which the card is transferred in the device of FIG. 15.

An embodiment shown in FIG. 15 has a card discharge port 1*b* on the level with the second feeding path P2 and a discharge stacker 60 on the outside of the casing 1. Other elements are substantially identical with and denoted by the same reference numerals as the corresponding ones of the embodiment shown in FIG. 2. That is, this embodiment has the discharge port 1*b* disposed on the opposite side to the second turning portion 50 and placed opposite to the card reject port 1*c*.

In this embodiment, the card C is fed to the first recording unit 20 through the first turning portion 40 (arrow a41), subjected to printing an the obverse in the first recording unit 20, and sent back to the first turning portion 40 (arrow a42). If the card is required to be printed on its reverse face, the card may be sent back to the first recording unit 20 (arrow a41) upon making a half turn (rotation of 180 degrees).

When sending the card to the second recording unit 30, the card is turned one-fourth of a rotation in the respective first turning portion 40 and the second turning portion 50 (arrows a43 and a44).

Although the card has the reverse facing upward at this time, if the obverse is required to face upward, the card may be turned one-fourth of a rotation in either of the first and second turning portions 40 and 50. In a case that a write error is found as the result of verifying the data written to the card in the second recording unit (arrow a45), the faulty card is discharged through the reject port 1*c* (arrow a46), or otherwise, the card adequately recorded is sent out through the discharge port 1*b* (arrow a47).

According to this embodiment, after transferring the card processed in the first recording unit 20 to the second recording unit 30, the adequately recorded card can be sent out directly to the discharge stacker 60 without being sent back to the first recording unit 20.

Figure 17:
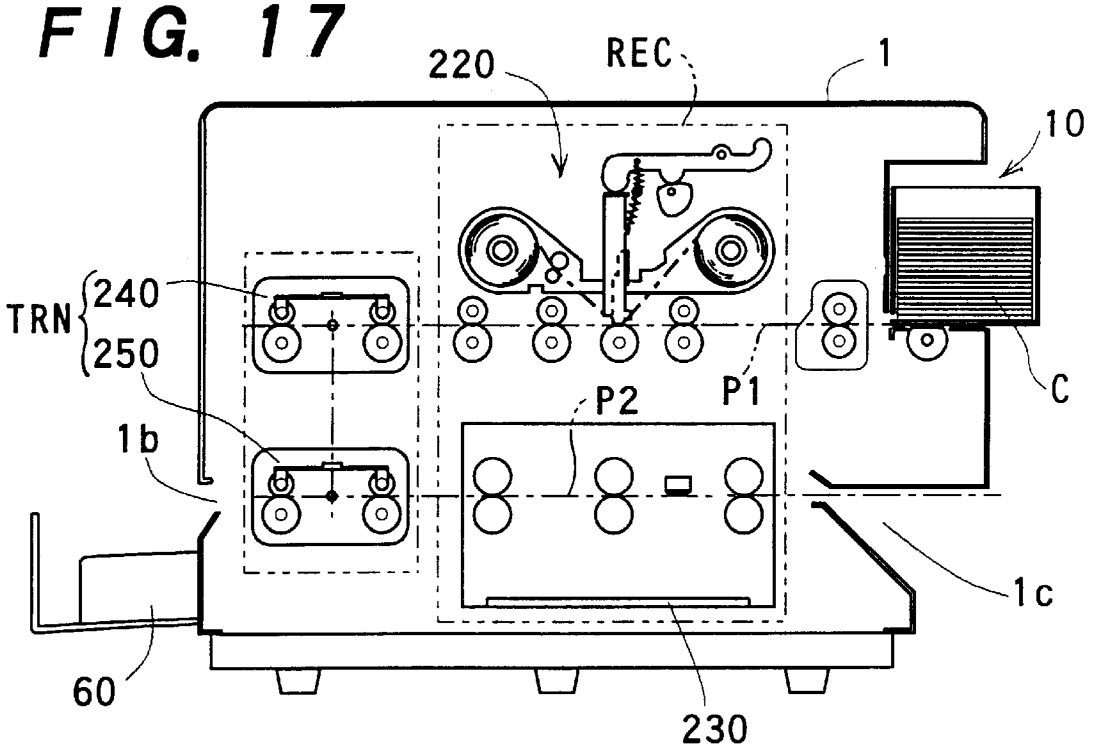
FIG. 17 is a front view schematically showing a fourth embodiment of this invention.
Figure 18:
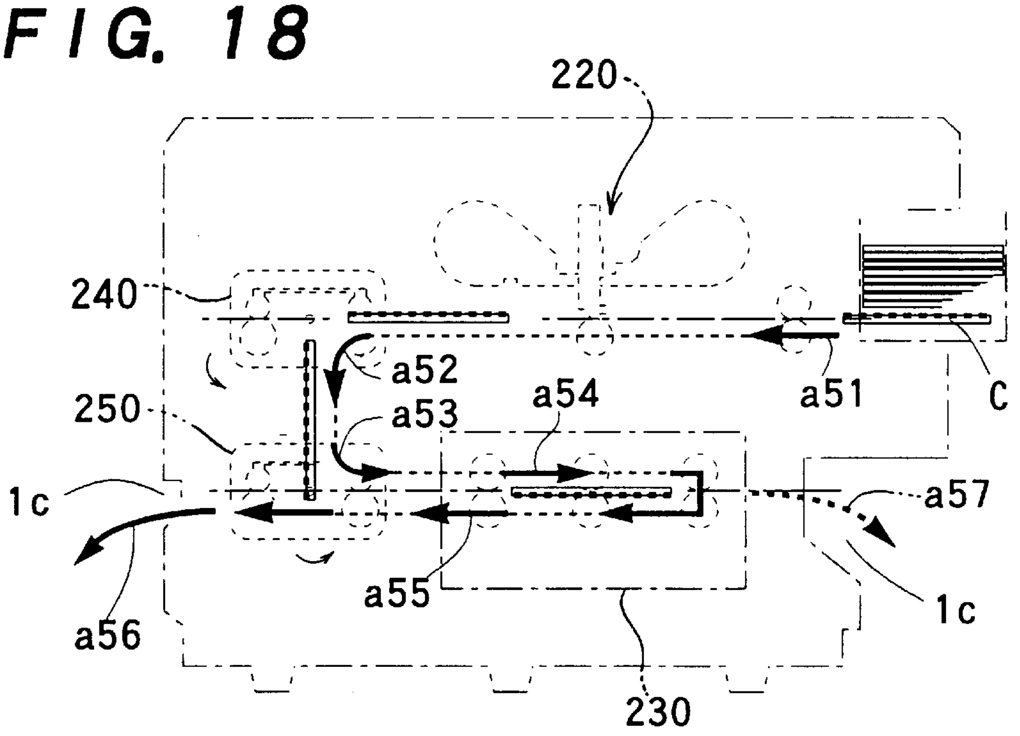
FIG. 18 is a schematic front view showing a process in which the card is transferred in the device of FIG. 17.

FIG. 17 shows yet another embodiment in which the card discharge port 1*b* which is on the level with the upper card feeding path P1 in the embodiment shown in FIG. 12 is on the level with the lower card feeding path P2, and the discharge stacker 60 is attached to the outside of the casing 1, similarly to the embodiment of FIG. 15. Other elements are substantially identical with and denoted by the same reference numerals as the corresponding elements in the embodiment of FIG. 12.

In this embodiment, the card C is first supplied from the card supply portion 10 to the first recording unit 220 (arrow a51), and then, sent to the first turning portion 240 upon printing on the obverse of the card in the first recording unit 220. The card C is turned one-fourth of a rotation in the first turning portion 240 (arrow a52), sent to the second turning portion 250 to be further turned one-fourth of a rotation (arrow a53), and then, sent to the second recording portion 230 (arrow a54).

To perform the printing on the reverse of the card in the first recording unit 220, the card may be turned three-fourth of a rotation (rotation of 270 degrees) when transferred to the first turning portion 240 (arrow a52) and again sent back to the first recording unit 220. When the card C undergoing the recording in the second recording unit 230 is judged to be proper as the result of verification, the card is sent to the second turning portion 250 along the second feeding path P2 (arrow a55), and discharged through the discharge port 1*b* through the second turning portion (arrow a56). On the other hand, as the result of verification, the card is judged to be faulty, it is discharged from the second recording unit 230 through the reject port 1*c* (arrow a57).

According to this embodiment, the adequately finished card which has been processed being sent from the first recording unit to the second recording unit can be discharged through the discharge port 1*b* without being sent back to the first feeding path P1, similarly to the embodiment of FIG. 15.

The diverse card transferring manners as described above referring to the embodiments of FIGS. 7 through 10, FIG. 13, FIG. 14, FIG. 16 and FIG. 18 can be variously and freely recomposed or combined according to the arrangement of the device and the purpose of obtaining the desired information card, by incorporating card transferring patterns into the program in a control system of the card producing device in advance in accordance with the structure of the device. The card transferring patterns thus programed in the control system can be automatically or manually determined arbitrarily by an operator according to the purposes and usage.

As described above, the information card producing device of this invention comprises the vertically arranged multi-stage recording units including one or more printer portions, and the card turning portions which confront the respective recording units so as to transfer or turn the card. Therefore, the card units including the printer and magnetic encoder, the card supply portion, and the card discharge portion can be intensively integrated and formed into a simple and compact formation, heightening design, handling, installing and marketing properties.

Furthermore, since the feeding rollers in the card turning portion are prevented from rotating on their own axes when revolving around the supporting axis to turn over the card, the card held between the feeding rollers can be stably and accurately transferred and turned over without being dislocated. Therefore, the desired information data can be recorded on the card, consequently heightening quality of the information card resultantly produced.

Moreover, the device of this invention has the useful functions of verifying the information data recorded to the card and discharging the faulty card found as the result of verification to the reject portion, so that the adequately finished cards can be belittingly sifted from the faulty cards. The reject portion is rationally arranged with the card supply portion and the card discharge portion, so that the device can be conveniently and easily handled.

Besides, the present invention fundamentally provides the ideal device for dealing with various plastic information cards, but, when being applied to IC cards, it is possible to let the card recording unit have a function of writing digital information data to an electronic memory incorporated in the IC card. Thus, the device of the invention is conveniently adapted for various purposes.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An information card producing device comprising:

a recording portion having recording units, at least one of said recording units including means for printing information data on at least one surface of a recording medium card, said recording units being arranged one over another;

each of said recording units having a card feeding path and a card transfer portion for transferring said recording medium card relative to said recording units through said card feeding paths and for turning over said recording medium card.

2. An information card producing device according to claim 1, wherein said printing means is a thermal transfer printer.

3. An information card producing device according to claim 1, wherein one of said recording units includes a magnetic recording encoder and/or an IC memory reader/writer.

4. An information card producing device according to claim 2, wherein one of said recording units includes a magnetic recording encoder and/or an IC memory reader/writer.

5. An information card producing device comprising:

a casing having a card supply side wall with a card supply port, an opposite card discharge side wall with a card discharge port, a first feeding path extending through said card supply port, and a second feeding path formed beneath said first feeding path in substantially parallel with said first feeding path;

a card supply portion mounted onto said card supply port;

a recording portion including a first recording unit disposed on said first feeding path for recording information data on at least one surface of a card, and a second recording unit disposed on said second feeding path for recording information data on at least one surface of said card; and a card transfer portion including a first card turning portion confronting said first recording unit on said first feeding path for transferring and turning over said card, and a second card turning portion confronting said second recording unit on said second feeding path for transferring and turning over said card;

wherein said card is sent from one of the first feeding path and the second feeding path to the other of the first feeding path and the second feeding path by operating the card transfer portion.

6. An information card producing device according to claim 5, wherein one of said recording units is a thermal transfer printer, and the other recording unit includes a magnetic recording encoder and/or an IC memory reader/writer.

7. An information card producing device according to claim 5, wherein said first and second recording units each are formed of a thermal transfer printer.

8. An information card producing device according to claim 5, wherein said card transfer portion is interposed between said card supply portion and said recording portion.

9. An information card producing device according to claim 5, wherein said card transfer portion is interposed between said recording portion and said card discharge portion.

10. An information card producing device according to claim 5, wherein said discharge port is disposed on the level with said first feeding path, and further comprising a discharge stacker disposed outside said casing confronting said card discharge port.

11. An information card producing device according to claim 5, wherein said card discharge port is disposed on the level with said second feeding path, and further comprising a discharge stacker disposed outside said casing confronting said card discharge port.

12. An information card producing device according to claim 5, further comprising a card reject port disposed on said second feeding path and formed under said card supply port in said casing, so that when finding a faulty card causing write error in at least one of said recording units, said faulty card is discharged through said card reject port.

13. An information card producing device according to claim 5, further comprising cleaning means formed of rollers disposed between said first card turning portion and said first recording unit on said first feeding path for cleaning at least one surface of said card.

14. An information card producing device according to claim 5, wherein each of said first and second card turning portions includes a rotating frame supported by a rotating shaft placed on said first or second feeding path, paired feeding rollers rotatably supported by said rotating frame, and press rollers coming in elastic contact with said feeding rollers on said first or second feeding path, so as to hold a card therebetween, which device further comprises a feeding motor connected to said feeding rollers of said first and second being portions through rotation transmitting means so as to transmit rotation to said feeding rollers to transfer said card, and a revolving motor for giving rotation to both said rotating frames of said first and second card turning portions to permit said rotating frames to revolve around said rotating shafts, said feeding rollers being driven so that, when revolving said rotating frames by driving said revolving motor, transmission of rotation from said feeding motor to said feeding rollers is negated.

15. An information card producing device according to claim 5, wherein said card transfer portion includes a plurality of card sensors for detecting the card.

* * * * *